United States Patent
Kakinoki

(10) Patent No.: US 10,442,488 B2
(45) Date of Patent: Oct. 15, 2019

(54) BICYCLE ELECTRICAL COMPONENT

(71) Applicant: Shimano Inc., Sakai, Osaka (JP)

(72) Inventor: Nobuyuki Kakinoki, Osaka (JP)

(73) Assignee: Shimano Inc., Osaka (JP)

( * ) Notice: Subject to any disclaimer, the term of this patent is extended or adjusted under 35 U.S.C. 154(b) by 336 days.

(21) Appl. No.: 15/636,741

(22) Filed: Jun. 29, 2017

(65) Prior Publication Data

US 2019/0002053 A1    Jan. 3, 2019

(51) Int. Cl.

| | |
|---|---|
| *B62J 9/00* | (2006.01) |
| *G07C 5/08* | (2006.01) |
| *H04W 84/00* | (2009.01) |
| *G07C 5/00* | (2006.01) |
| *B62K 19/40* | (2006.01) |
| *B62J 99/00* | (2009.01) |
| *B62K 25/04* | (2006.01) |
| *B62M 6/55* | (2010.01) |
| *B62M 6/90* | (2010.01) |
| *B62M 9/122* | (2010.01) |
| *B62M 9/132* | (2010.01) |
| *B62M 25/08* | (2006.01) |
| *B62K 23/02* | (2006.01) |
| *B62J 1/08* | (2006.01) |

(52) U.S. Cl.
CPC ............. *B62J 9/00* (2013.01); *B62K 19/40* (2013.01); *G07C 5/00* (2013.01); *G07C 5/006* (2013.01); *G07C 5/0816* (2013.01); *H04W 84/005* (2013.01); *B60L 2200/12* (2013.01); *B62J 2001/085* (2013.01); *B62J 2099/002* (2013.01); *B62J 2099/004* (2013.01); *B62J 2099/0033* (2013.01); *B62K 23/02* (2013.01); *B62K 2025/045* (2013.01); *B62K 2025/048* (2013.01); *B62M 6/55* (2013.01); *B62M 6/90* (2013.01); *B62M 9/122* (2013.01); *B62M 9/132* (2013.01); *B62M 25/08* (2013.01); *G07C 5/008* (2013.01)

(58) Field of Classification Search
CPC . B62J 9/00; B62K 19/40; B62K 23/02; G07C 5/00; G07C 5/006; G07C 5/008; G07C 5/0816; H04W 84/005
See application file for complete search history.

(56) References Cited

U.S. PATENT DOCUMENTS

| | | |
|---|---|---|
| 7,878,521 B2 | 2/2011 | Blomme et al. |
| 8,909,424 B2 | 12/2014 | Jordan et al. |
| 2014/0191493 A1 | 7/2014 | Dal Pozzo |
| 2016/0153515 A1* | 6/2016 | Ebersbach ............... F16F 9/34 188/266.3 |
| 2016/0216169 A1* | 7/2016 | Tetsuka ................ G01L 5/161 |
| 2016/0221627 A1* | 8/2016 | Hines ...................... B62J 99/00 |

(Continued)

*Primary Examiner* — Anne M Hines
(74) *Attorney, Agent, or Firm* — Global IP Counselors, LLP

(57) ABSTRACT

A bicycle electrical component is basically provided with a cover, a battery and a wireless communication unit. The cover is configured to cover an opening formed on a bicycle. The cover has a center plane bisecting the cover in a thickness direction of the cover, a first side and a second side opposite to the first side with respect to the center plane. The battery configured to be attached to the cover and to be entirely disposed on one of the first side and the second side. The wireless communication unit is configured to be attached to the cover and to be entirely disposed on the other of the first side and the second side.

21 Claims, 9 Drawing Sheets

(56) References Cited

U.S. PATENT DOCUMENTS

| | | | |
|---|---|---|---|
| 2016/0280300 A1* | 9/2016 | Latzke | B62J 6/04 |
| 2017/0057595 A1* | 3/2017 | Peng | B62M 6/50 |
| 2018/0057104 A1* | 3/2018 | Komatsu | B62L 3/023 |
| 2018/0148127 A1* | 5/2018 | Sato | B62L 3/02 |

* cited by examiner

BICYCLE ELECTRICAL COMPONENT

BACKGROUND

Field of the Invention

This invention generally relates to a bicycle electrical component. More specifically, the present invention relates to a bicycle electrical component provided with a wireless communication unit.

Background Information

In recent years, some bicycles are provided with bicycle electrical components or devices to make it easier for the rider to operate the bicycle. Often, a battery is provided on the bicycle frame to supply electrical power to the bicycle electrical components. Some of these bicycles are provided with a bicycle wireless system in which bicycle electrical components wirelessly communicate with each other. Such wireless systems are often used for wireless shifting of a bicycle drive train. One example of a wireless shifting system is disclosed in U.S. Pat. No. 8,909,424.

SUMMARY

Generally, the present disclosure is directed to various features of a bicycle electrical component. In one feature, a bicycle electrical component is provided with a wireless communication unit.

In view of the state of the known technology and in accordance with a first aspect of the present disclosure, a bicycle electrical component is provided that basically comprises a cover, a battery and a wireless communication unit. The cover is configured to cover an opening formed on a bicycle. The cover has a center plane bisecting the cover in a thickness direction of the cover, a first side and a second side opposite to the first side with respect to the center plane. The battery configured to be attached to the cover and to be entirely disposed on one of the first side and the second side. The wireless communication unit is configured to be attached to the cover and to be entirely disposed on the other of the first side and the second side.

With the bicycle electrical component according to the first aspect, it is possible to simplify assembling and reduce assembling time since a user can assemble a battery and a wireless communication unit to a bicycle at the same time.

In accordance with a second aspect of the present invention, the bicycle electrical component according to the first aspect is configured so that one of the battery and the wireless communication unit is configured to be disposed in a cavity of the bicycle; and the cavity is in communication with the opening.

With the bicycle electrical component according to the second aspect, it is possible to effectively use an internal space of the bicycle for the battery.

In accordance with a third aspect of the present invention, the bicycle electrical component according to the second aspect is configured so that the battery is entirely disposed on the first side of the cover and disposed in the cavity of the bicycle.

With the bicycle electrical component according to the third aspect, it is possible to effectively use an internal space of the bicycle for the battery.

In accordance with a fourth aspect of the present invention, the bicycle electrical component according to the second or third aspect is configured so that the wireless communication unit is entirely disposed on the second side of the cover.

With the bicycle electrical component according to the fourth aspect, it is possible to effectively use an internal space of the bicycle for the battery.

In accordance with a fifth aspect of the present invention, the bicycle electrical component according to the fourth aspect further comprises a casing configured to be attached to the cover and to be entirely disposed on the second side of the cover. The casing is configured to seal the wireless communication unit between the casing and the cover.

With the bicycle electrical component according to the fifth aspect, it is possible to prevent water and other foreign substances from entering into the wireless communication unit.

In accordance with a sixth aspect of the present invention, the bicycle electrical component according to the fourth or fifth aspect is configured so that the casing is made of a radio wave transparent material.

With the bicycle electrical component according to the sixth aspect, it is possible to improve the quality of wireless communications.

In accordance with a seventh aspect of the present invention, the bicycle electrical component according to any one of the fourth to sixth aspects is configured so that the casing is made of a plastic material.

With the bicycle electrical component according to the seventh aspect, it is possible to improve the quality of wireless communications.

In accordance with an eighth aspect of the present invention, the bicycle electrical component according to any one of the first to seventh aspects further comprises a battery fastener supporting the battery to the cover.

With the bicycle electrical component according to the eighth aspect, it is possible to securely support the battery to the cover.

In accordance with a ninth aspect of the present invention, the bicycle electrical component according to the eighth aspect is configured so that the battery fastener includes at least one of a bolt, a band and adhesive.

With the bicycle electrical component according to the ninth aspect, it is possible to securely support the battery to the cover.

In accordance with a tenth aspect of the present invention, the bicycle electrical component according to any one of the first to ninth aspects further comprises a wireless communication unit fastener supporting the wireless communication unit to one of the first and second sides.

With the bicycle electrical component according to the tenth aspect, it is possible to securely support the wireless communication unit to the cover.

In accordance with an eleventh aspect of the present invention, the bicycle electrical component according to the tenth aspect is configured so that the wireless communication unit fastener includes at least one of a bolt, a band and adhesive.

With the bicycle electrical component according to the eleventh aspect, it is possible to securely support the wireless communication unit to the cover.

In accordance with a twelfth aspect of the present invention, the bicycle electrical component according to any one of the first to eleventh aspects further comprises a cover fastener supporting the cover on the bicycle.

With the bicycle electrical component according to the twelfth aspect, it is possible to securely attach the cover to the bicycle.

In accordance with a thirteenth aspect of the present invention, the bicycle electrical component according to the twelfth aspect is configured so that the cover fastener includes at least one of a bolt and a band.

With the bicycle electrical component according to the thirteenth aspect, it is possible to securely attach the cover to the bicycle.

In accordance with a fourteenth aspect of the present invention, the bicycle electrical component according to any one of the first to thirteenth aspects is configured so that the cover is made of a radio wave transparent material.

With the bicycle electrical component according to the fourteenth aspect, it is possible to improve a quality of wireless communication.

In accordance with a fifteenth aspect of the present invention, the bicycle electrical component according to the fourteenth aspect is configured so that the cover is made of a plastic material.

With the bicycle electrical component according to the fifteenth aspect, it is possible to improve a quality of wireless communication.

In accordance with a sixteenth aspect of the present invention, the bicycle electrical component according to any one of the first to fifteenth aspects is configured so that each of the cover, the battery and the wireless communication unit is a separated member.

With the bicycle electrical component according to the sixteenth aspect, it is possible to easily change the battery and the wireless communication unit when the need arises.

In accordance with a seventeenth aspect of the present invention, the bicycle electrical component according to any one of the first to seventh aspects is configured so that the battery and the wireless communication unit are integrally molded with the cover.

With the bicycle electrical component according to the seventeenth aspect, it is possible to reduce assembling steps of the bicycle electrical component.

In accordance with an eighteenth aspect of the present invention, a bicycle frame includes the bicycle electrical component according to any one of the first to seventeenth aspects and further comprises a frame portion including the opening. The cover is mounted on the frame portion and covers the opening.

With the bicycle frame according to the eighteenth aspect, it is possible to simplify assembly and reduce assembly time since a user can assemble a battery and a wireless communication unit to a bicycle at the same time.

In accordance with a nineteenth aspect of the present invention, the bicycle frame according to the eighteenth aspect is configured so that the frame portion is a down tube.

With the bicycle frame according to the nineteenth aspect, it is possible to simplify assembling and reduce assembling time since a user can assemble a battery and a wireless communication unit to a bicycle at the same time.

In accordance with a twentieth aspect of the present invention, the bicycle frame according to the eighteenth aspect is configured so that the frame portion is a seat tube.

With the bicycle frame according to the twentieth aspect, it is possible to simplify assembling and reduce assembling time since a user can assemble a battery and a wireless communication unit to a bicycle at the same time.

In accordance with a twenty-first aspect of the present invention, the bicycle frame according to the eighteenth aspect is configured so that the frame portion is a tubular member.

With the bicycle frame according to the twenty-first aspect, it is possible to simplify assembling and reduce assembling time since a user can assemble a battery and a wireless communication unit to a bicycle at the same time.

Also, other objects, features, aspects and advantages of the disclosed bicycle electrical component will become apparent to those skilled in the art from the following detailed description, which, taken in conjunction with the annexed drawings, discloses several embodiments of the bicycle electrical component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
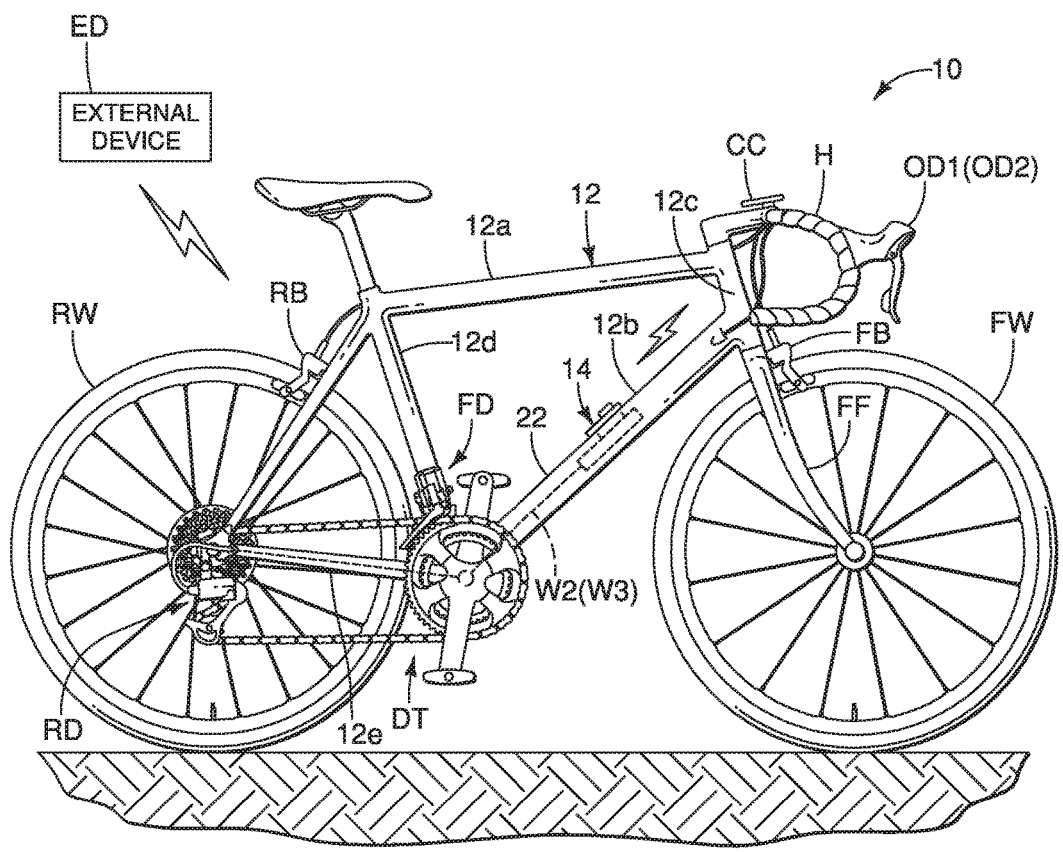
FIG. 1 is a side elevational view of a bicycle having a bicycle frame with a down tube that is equipped with a bicycle electrical component in accordance with a first illustrated embodiment.
Figure 2:
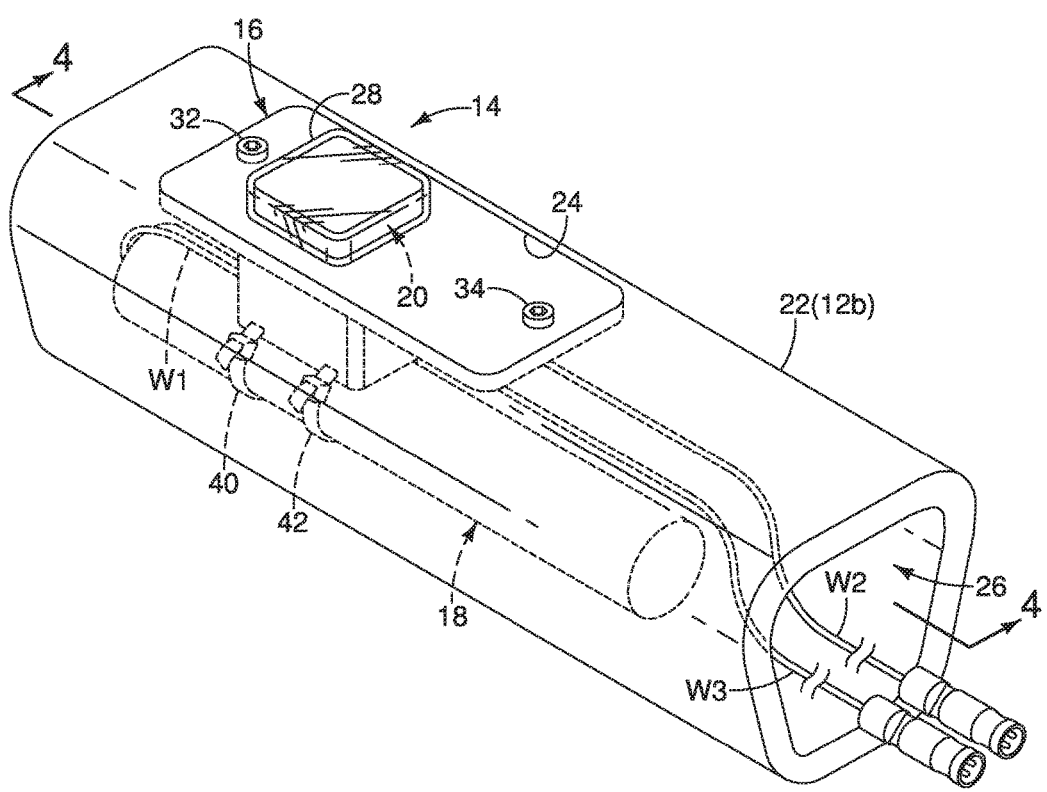
FIG. 2 is a perspective view of a portion of the bicycle frame that includes the bicycle electrical component illustrated in FIG. 1.

Referring initially to FIGS. 1 and 2, a bicycle 10 is illustrated having a bicycle frame 12 that includes a bicycle electrical component 14 in accordance with a first embodiment. As explained below, the bicycle electrical component 14 is one part of a bicycle component control system wherein the bicycle electrical component 14 wirelessly receives wireless signals from one or more bicycle electrical components and/or sends wireless signals to one or more bicycle electrical components. The wireless signals can be radio frequency (RF) signals or any other type of signal suitable for wireless communications as understood in the bicycle field. Basically, as seen in FIG. 2, the bicycle electrical component 14 comprises a cover 16, a battery 18 and a wireless communication unit 20. The battery 18 is configured to be attached to the cover 16. Also, the wireless communication unit 20 is configured to be attached to the cover 16. Here, in the first embodiment, each of the cover 16, the battery 18 and the wireless communication unit 20 is a separated member.

The term "wireless communication unit" as used herein includes a transceiver or a transmitter-receiver, and contemplates any device or devices, separate or combined, capable of transmitting and/or receiving wireless signals, including shift signals or control, command or other signals related to some function of the component being controlled. As mentioned above, the wireless signals can be radio frequency (RF) signals or any other type of signal suitable for wireless communications as understood in the bicycle field.

As seen in FIG. 1, the wireless communication unit 20 can wirelessly communicate with an external device ED (e.g., a tablet computer, a mobile smartphone, a portable computer, a desktop computer, etc.). The external device ED is used for other things such as calibrating, providing firmware and/or software updates for other bicycle components that include a wireless communication unit. Here, the external device ED is also used for pairing the wireless communication unit 20 with other bicycle components that include a wireless communication unit. The external device ED preferably communicates with a remote server that has a remote database (storage device having various data including but not limited to identification information for the bicycle components of the bicycle 10 and pairing information associated with the identification information for the bicycle components of the bicycle 10).

As seen in FIG. 2, the battery 18 of the bicycle electrical component 14 is electrically connected to the wireless communication unit 20 by an electrical power line W1 to supply electrical power to the wireless communication unit 20. The battery 18 can also be electrically connected to an electric generator (not shown) to recharge the battery 18. Preferably, the electrical power line W1 is detachably connected to the wireless communication unit 20 so that the battery 18 can be disconnected from the wireless communication unit 20 and subsequently reconnected to the wireless communication unit 20.

As further seen in FIG. 2, the bicycle frame 12 comprises a frame portion 22 including an opening 24. The cover 16 is mounted on the frame portion 22 and covers the opening 24. In other words, the cover 16 is configured to cover the opening 24 that is formed on the bicycle 10. Here, the frame portion 22 is a tube portion of the bicycle frame 12. In other words, the frame portion 22 is a tubular member. Thus, the frame portion 22 includes a cavity 26 that partially receives the bicycle electrical component 14. The cavity 26 is in communication with the opening 24. One of the battery 18 and the wireless communication unit 20 is configured to be disposed in the cavity 26 of the bicycle 10. In the first embodiment, the battery 18 is disposed in the cavity 26 of the bicycle 10, while the wireless communication unit 20 is disposed outside of the cavity 26 of the bicycle 10 when the bicycle electrical component 14 is mounted to the frame portion 22.

Here, in the first embodiment, the bicycle electrical component 14 further comprises a casing 28 that is configured to be attached to the cover 16. The casing 28 is configured to seal the wireless communication unit 20 between the casing 28 and the cover 16. Preferably, the casing 28 is also integrally molded with the cover 16. For example, the casing 28 can be overmolded onto the wireless communication unit 20 and the cover 16 to encapsulate the wireless communication unit 20 by using an overmolding process. In the first embodiment, the casing 28 is made of a radio wave transparent material. For example, in the first embodiment, the casing 28 is made of a plastic material.

In the first embodiment, the bicycle electrical component 14 is one part of an electrically powered shifting system for the bicycle 10. While the bicycle 10 is illustrated as a road bicycle, the bicycle electrical component 14 can be used with other types of bicycles as needed and/or desired. Moreover, the bicycle electrical component 14 is not limited to use with electrically powered shifting system, but can be used with other bicycle component control systems. For example, the bicycle electrical component 14 can be used with other wireless systems and/or wireless components of the bicycle 10, such as adjustable suspensions, adjustable seatposts, bicycle computers, etc.

As seen in FIG. 1, the bicycle frame 12 basically includes a top tube 12a, a down tube 12b, a head tube 12c, a seat tube 12d and a pair of chain stays 12e. In the first embodiment, the frame portion 22 is the down tube 12b of the bicycle frame 12. The front ends of the top tube 12a and the down tube 12b are rigidly connected together by the head tube 12c. The rear end of the top tube 12a is rigidly connected to an upper end of the seat tube 12d. A bottom bracket shell (not shown) rigidly connects the rear end of the down tube 12b and the bottom end of the seat tube 12d. The top tube 12a, the down tube 12b, the head tube 12c and the seat tube 12d are hollow tubes that can have a variety of cross sectional shapes, e.g., round, oval, polygonal, etc. In addition to the bicycle frame 12 and the bicycle electrical component 14, the bicycle 10 includes, among other things, a handlebar H, a front fork FF, a front wheel FW, a rear wheel RW, a front brake FB, a rear brake RB and a drive train DT. The drive train DT is configured to convert the rider's pedaling force into driving force.

As seen in FIG. 1, the bicycle 10 further includes an electric rear derailleur RD and an electric front derailleur FD. The rear derailleur RD is operated by a first operating device OD1. The front derailleur FD is operated by a second operating device OD2 that is behind the first operating device OD1 in FIG. 1. The first and second operating devices OD1 and OD2 are bicycle shifters that wireless communicate with the bicycle electrical component 14 as explained below. The electric rear derailleur RD and an electric front derailleur FD receives electrical power from the battery 18 (i.e., an electrical power source). On the other hand, the first and second operating devices OD1 and OD2 do not receive electrical power from the battery 18. Rather, an additional electrical power source (an additional battery or an electric generator) is preferably provided for the first and second operating devices OD1 and OD2. For example, each of the first and second operating devices OD1 and OD2 can include a separate disposable coin battery.

Also in the illustrated embodiment of FIG. 1, the first and second operating devices OD1 and OD2 are used to mechanically operate the rear brake RB and the front brake FB, respectively. While the first and second operating devices OD1 and OD2 are used to wirelessly operate the rear derailleur RD and the front derailleur FD respectively, the first and second operating devices OD1 and OD2 can be used to operate other bicycle electrical components when the bicycle electrical component 14 is connected to other bicycle electrical components.

Figure 3:
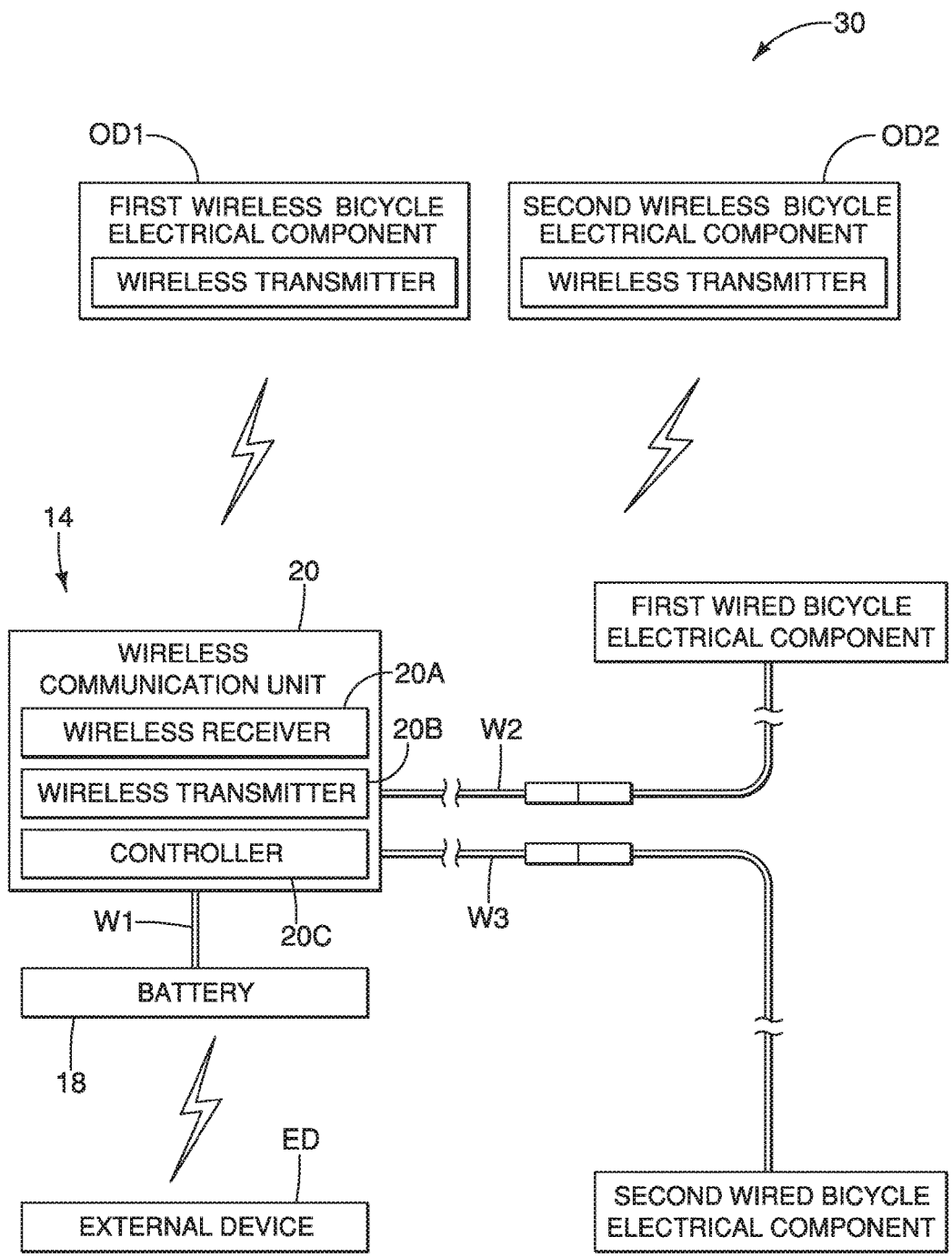
FIG. 3 is a simplified schematic block diagram of an example of a bicycle component control system used in the bicycle illustrated in FIG. 1.

As seen in FIGS. 1 and 3, the bicycle electrical component 14 is one part of a bicycle component control system 30. Here, as seen in FIG. 1, the bicycle component control system 30 is an electrically powered shifting system. However, the bicycle component control system 30 of FIG. 3 can be used to control other bicycle components such as an adjustable seatpost, an adjustable suspension, a bicycle computer, a drive unit, etc. In the case of the electrically powered shifting system of FIG. 1, the bicycle component control system 30 comprises the bicycle electrical component 14, the first operating device OD1 (i.e., a first wireless bicycle electrical component in FIG. 3) and the second operating device OD2 (i.e., a second wireless bicycle electrical component in FIG. 3), the rear derailleur RD (i.e., a first wired bicycle electrical component in FIG. 3) and the front derailleur FD (i.e., a second wired bicycle electrical component in FIG. 3).

As illustrated in FIG. 3, the bicycle electrical component 14, the rear derailleur RD and the front derailleur FD all receive electrical power from the battery 18. In particular, the bicycle electrical component 14 receives electrical power via the electric power line W1 as mentioned above. The rear derailleur RD is electrically connected to the bicycle electrical component 14 by an electric power line W2 such that the rear derailleur RD receives electrical power from the battery 18 via the bicycle electrical component 14 and the electric power line W2. Similarly, the front derailleur FD is electrically connected to the bicycle electrical component 14 by an electric power line W3 such that the front derailleur FD receives electrical power from the battery 18 via the bicycle electrical component 14 and the electric power line W3. Each of the electric power lines W1 to W3 includes a ground line and a power or voltage line that are detachably connected to a serial bus that is formed by a communication interface in each of the bicycle electrical component 14, the rear derailleur RD and the front derailleur FD. The battery 18 is an example of an electrical power source device.

Here, the battery 18 is preferably rechargeable battery. However, other types of electrical power source device can be used in place of the battery 18. For example, the battery 18 can be replaced with electrical power source devices such as a hydrogen powered fuel cell or a capacitor.

Preferably, the bicycle electrical component 14, the rear derailleur RD and the front derailleur FD communicate with each other using power line communication (PLC). Power line communication (PLC) carries data on a conductor that is also used simultaneously for electric power transmission or electric power distribution to the electric component. Power line communication uses unique identifying information such as a unique identifier that is assigned to each of the electric devices (i.e., the bicycle electrical component 14, the rear derailleur RD and the front derailleur FD). Alternately, each of the electric power lines W2 and W3 can include a separate signal communication line to send and receive control signals between the bicycle electrical component 14 and the rear and front derailleurs RD and FD.

As seen in FIG. 3, in the first embodiment, the wireless communication unit 20 includes, among other things, a wireless receiver 20A, a wireless transmitter 20B and an electronic controller 20C. Thus, the wireless communication unit 20 is a two-way wireless communication unit that conducts two-way wireless communications using the wireless receiver 20A and the wireless transmitter 20B. For example, the wireless communication unit 20 can conduct two-way communications with the external device shown in FIGS. 1 and 3. Each of the first and second operating devices OD1 and OD2 also includes a wireless communication unit, which can be just a wireless transmitter that transmits wireless signals to the wireless communication unit 20.

It should also be understood that the wireless transmitters of the first and second operating devices OD1 and OD2 and the wireless communication unit 20 can transmit signals at a particular frequency and/or with an identifier such as a particular code, to distinguish the wireless control signal from other wireless control signals. In this way, the wireless communication unit 20 can recognize which control signals are shifting signals from which of the first and second operating devices OD1 and OD2. Thus, the wireless communication unit 20 can ignore the control signals from other devices in the area, and the electronic controller 20C can appropriately operate the rear and front derailleurs RD and FD.

The electronic controller 20C is preferably a microcomputer that includes conventional components such as includes a central processing unit (CPU) or processor, an input interface circuit, an output interface circuit, and storage devices such as a ROM (Read Only Memory) device, a RAM (Random Access Memory) device and/or a FLASH memory device. The electronic controller 20C is programmed to process signals from an upshift switch of the first operating device OD1 as upshifting signals and to process signals from a downshift switch of the first operating device OD1 as downshifting signals for shifting the rear derailleur RD. The electronic controller 20C is programmed to process signals from an upshift switch of the second operating device OD2 as upshifting signals and to process signals from a downshift switch of the second operating device OD2 as downshifting signals for shifting the front derailleur FD.

The controllers (not shown) of the rear derailleur RD and the front derailleur FD communicates the electronic controller 20C through the electric power lines W2 and W3, respectively. Thus, the electronic controller 20C is configured to send and receive control signals to and from the rear derailleur RD and the front derailleur FD via power line communication (PLC). Preferably, each of the electric devices (i.e., the bicycle electrical component 14, the rear derailleur RD and the front derailleur FD) is provided with a memory from which information stored by communications can be read and in which the unique identifying information is stored.

Figure 4:
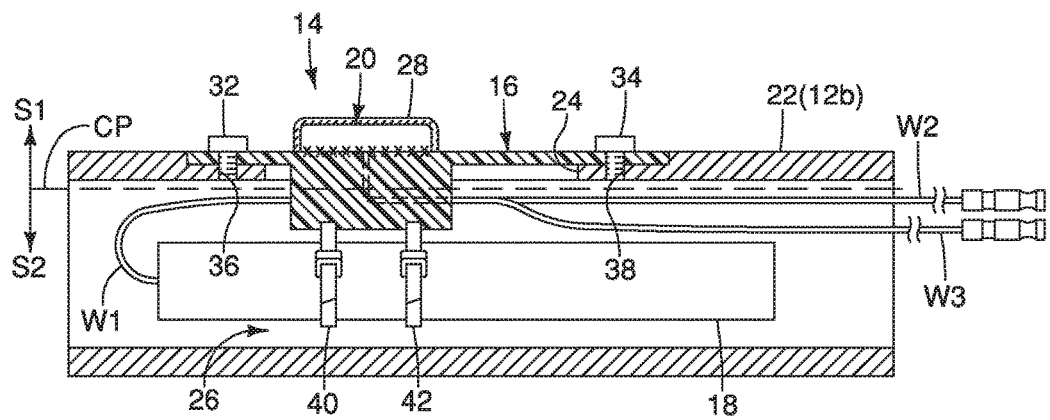
FIG. 4 is a cross sectional view of the portion of the bicycle frame and the bicycle electrical component as seen along section line 4-4 of FIG. 2.

As seen in FIGS. 2 and 4, in the first embodiment, the bicycle electrical component 14 further comprises a cover fastener 32 supporting the cover 16 on the bicycle 10. Preferably, the cover fastener 32 includes at least one of a bolt and a band. Here, the cover 16 is detachably attached to the frame portion 22 by the cover fastener 32 and a cover fastener 34. In the first embodiment, the cover fasteners 32 and 34 are bolts (i.e., threaded fasteners) that are screwed into threaded holes 36 and 38, as seen in FIG. 4. However, other types of fasteners can be used instead of or in conjunction with the cover fasteners 32 and 34. Preferably, the cover 16 is made of a radio wave transparent material. For example, in the first embodiment, the cover 16 is made of a plastic material. The wireless communication unit 20 is attached to the cover 16 by adhesive, which is illustrated by a series of X's. Alternatively, the cover 16 and the wireless communication unit 20 are connected by overmolding the cover 16 onto the wireless communication unit 20.

Figure 5:
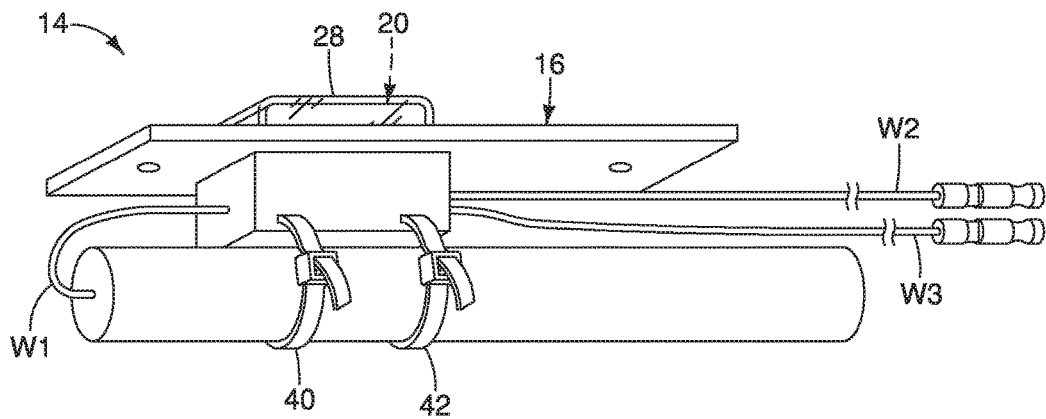
FIG. 5 is a perspective view of the bicycle electrical component in accordance with the embodiment illustrated in FIGS. 2 to 4.

As seen in FIGS. 4 and 5, the bicycle electrical component 14 further comprises a battery fastener 40 supporting the battery 18 to the cover 16. Preferably, the battery fastener 40 includes at least one of a bolt, a band and adhesive. Here, the battery 18 is attached to the cover 16 by the battery fastener 40 and a battery fastener 42. In the first embodiment, the battery fasteners 40 and 42 are bands such as disposable plastic ties or bands with a buckle. In the case of disposable plastic ties, the battery 18 can be detached from the cover 16 by cutting the plastic ties, and the battery 18 can be reattached to the cover 16 by using new plastic ties. In the case of bands with a buckle, the battery 18 can be detached from the cover 16 and reattached to the cover 16 by using the same bands.

Referring now to FIGS. 4 and 5, the cover 16 has a center plane CP bisecting the cover 16 in a thickness direction of the cover 16. The cover 16 further has a first side S1 and a second side S2. The second side S2 is opposite to the first side S1 with respect to the center plane CP. The battery 18 is configured to be entirely disposed on one of the first side S1 and the second side S2. The wireless communication unit 20 is configured to be entirely disposed on the other of the first side S1 and the second side S2. For example, in the first embodiment, the battery 18 is entirely disposed on the first side S1 of the cover 16, and is disposed in the cavity 26 of the bicycle 10. Also, for example, in the first embodiment, the wireless communication unit 20 is entirely disposed on the second side S2 of the cover 16 and the casing 28 is configured to be entirely disposed on the second side S2 of the cover 16.

Figure 6:
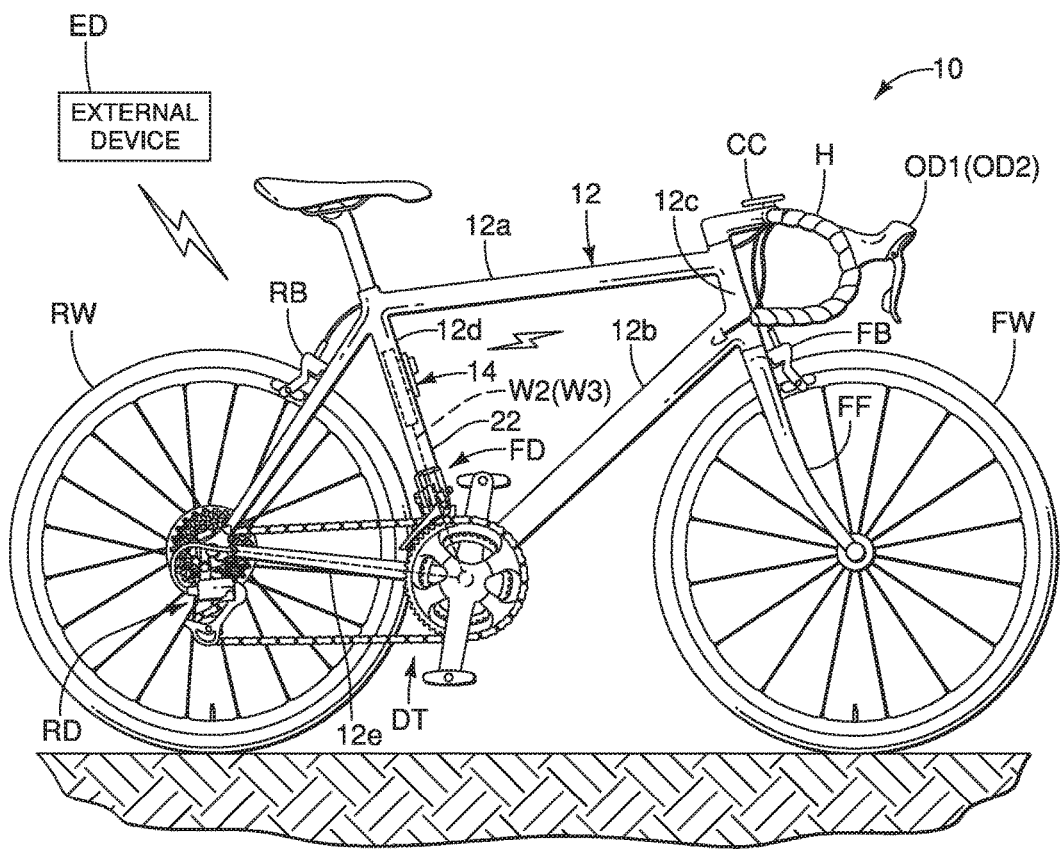
FIG. 6 is a side elevational view of a bicycle having a bicycle frame with a seat tube that is equipped with the bicycle electrical component illustrated in FIGS. 2 and 4.

Referring now to FIG. 6, here, the bicycle electrical component 14 is provided on the seat tube 12d of the bicycle 10. In other words, only difference between FIGS. 1 and 6 is the location of the bicycle electrical component 14. Thus, in the configuration of FIG. 6, the frame portion 22 is the seat tube 12d.

Figure 7:
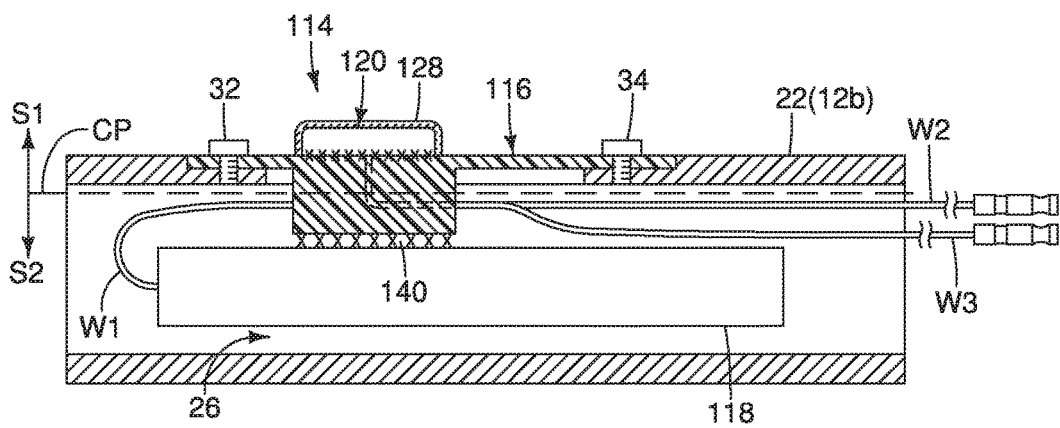
FIG. 7 is a cross sectional view, similar to FIG. 4, of a portion of a bicycle frame and a bicycle electrical component in accordance with a first modification.

Referring now to FIG. 7, the frame portion 22 (e.g., the down tube 12b or the seat tube 12d) is provided with a bicycle electrical component 114 in accordance with a first modification. Basically, the bicycle electrical component 114 comprises a cover 116, a battery 118 and a wireless communication unit 120. The bicycle electrical component 114 further comprises a casing 128 that is mold to the cover 116. The casing 128 is configured to seal the wireless communication unit 120. Here, the only difference between the bicycle electrical component 14 and the bicycle electrical component 114 is that the battery 118 is fastened to the wireless communication unit 120 by adhesive 140 instead of using the bands 40 and 42.

Figure 8:
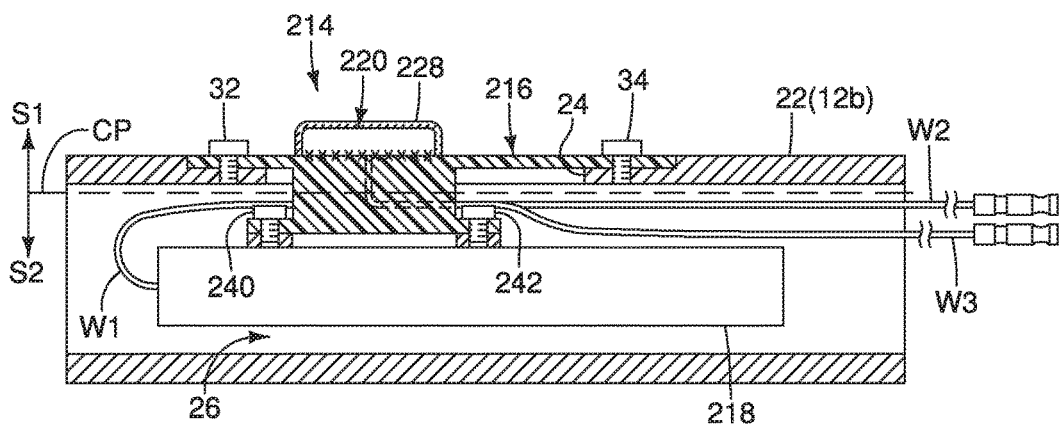
FIG. 8 is a cross sectional view, similar to FIGS. 4 and 7, of a portion of a bicycle frame and a bicycle electrical component in accordance with a second modification.

Referring now to FIG. 8, the frame portion 22 (e.g., the down tube 12b or the seat tube 12d) is provided with a bicycle electrical component 214 in accordance with a second modification. Basically, the bicycle electrical component 214 comprises a cover 216, a battery 218 and a wireless communication unit 220. The bicycle electrical component 214 further comprises a casing 228 that is mold to the cover 216. The casing 228 is configured to seal the wireless communication unit 220. Here, the only difference between the bicycle electrical component 14 and the bicycle electrical component 214 is that the battery 218 is fastened to the wireless communication unit 220 by a pair of bolts 240 and 242 instead of using the bands 40 and 42.

Figure 9:
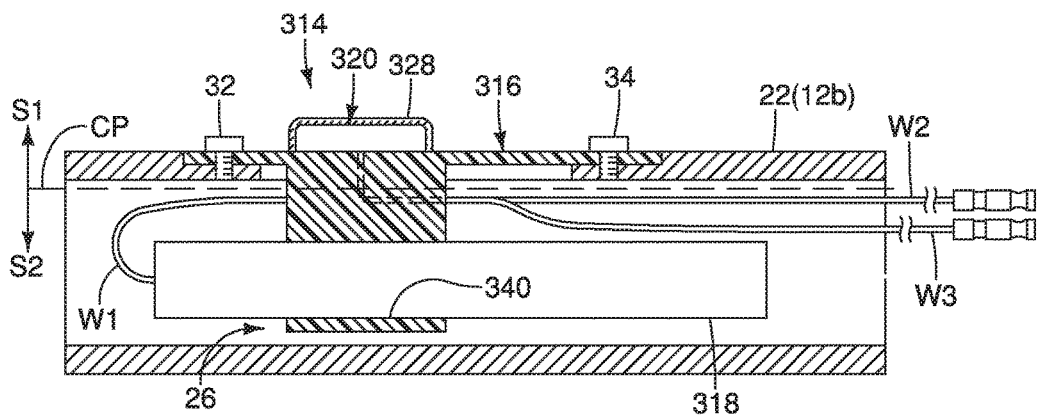
FIG. 9 is a cross sectional view, similar to FIGS. 4, 7 and 8, of a portion of a bicycle frame and a bicycle electrical component in accordance with a third modification.

Referring now to FIG. 9, the frame portion 22 (e.g., the down tube 12b or the seat tube 12d) is provided with a bicycle electrical component 314 in accordance with a third modification. Basically, the bicycle electrical component 314 comprises a cover 316, a battery 318 and a wireless communication unit 320. The bicycle electrical component 314 further comprises a casing 328 that is mold to the cover 316. The casing 328 is configured to seal the wireless communication unit 320. Here, the only difference between the bicycle electrical component 14 and the bicycle electrical component 314 is the fastening of the battery 318 and the wireless communication unit 320 to the cover 316. Here, the battery 318 and the wireless communication unit 320 are fastened to the cover 316 by overmolding the cover 316 onto the battery 318 and the wireless communication unit 320. As a result, the battery 318 is disposed in an attachment area 340 of the cover 316. In this way, the battery 318 and the wireless communication unit 320 are integrally molded with the cover 316.

Figure 10:
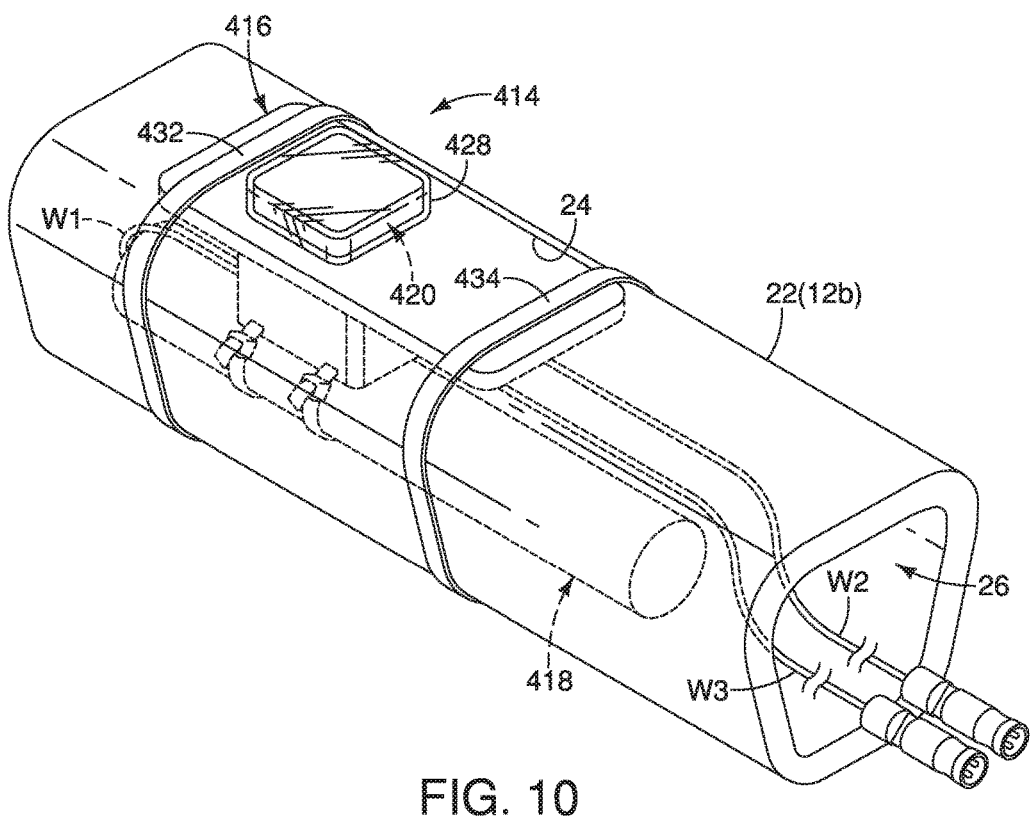
FIG. 10 is a perspective view of a portion of a bicycle frame that includes a bicycle electrical component in accordance with a fourth modification.

Referring now to FIG. 10, the frame portion 22 (e.g., the down tube 12b or the seat tube 12d) is provided with a bicycle electrical component 414 in accordance with a fourth modification. Basically, the bicycle electrical component 414 comprises a cover 416, a battery 418 and a wireless communication unit 420. The bicycle electrical component 414 further comprises a casing 428 that is mold to the cover 416. The casing 428 is configured to seal the wireless communication unit 420. Here, the only difference between the bicycle electrical component 14 and the bicycle electrical component 414 is that the cover 416 is attached to the frame portion 22 by a pair of cover fasteners 432 and 434 that are bands such as plastic ties instead of being attached with the cover fasteners 32 and 34, which are bolts.

Figure 11:
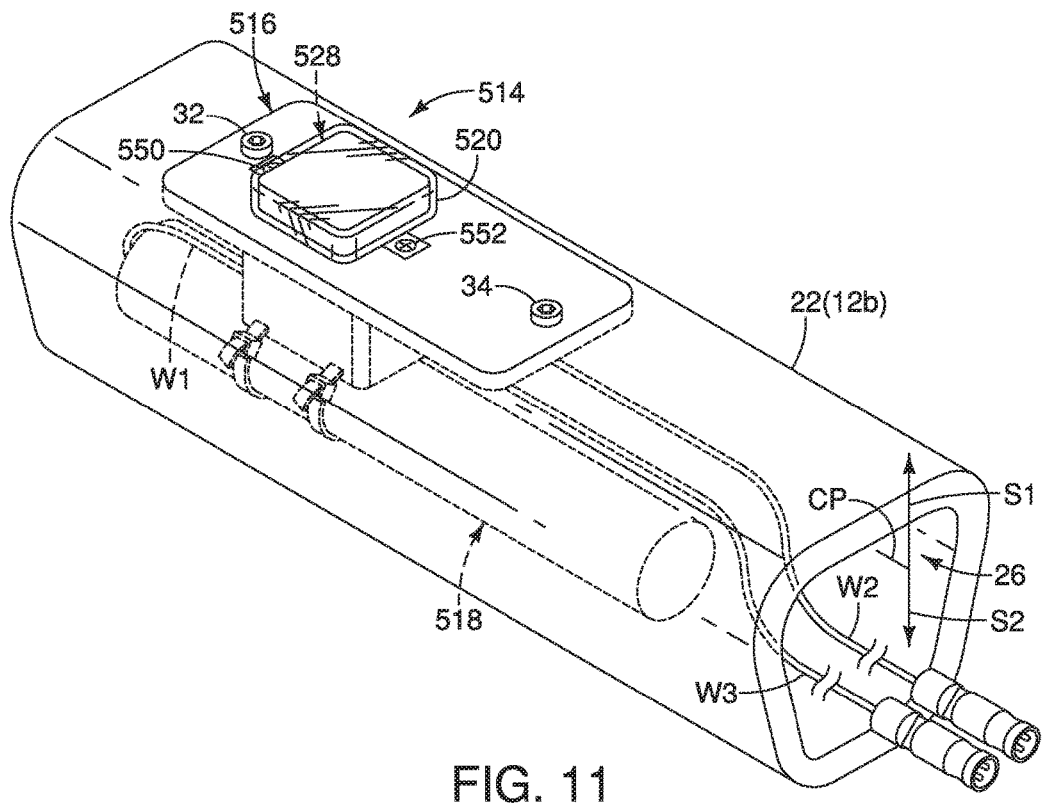
FIG. 11 is a perspective view of a portion of a bicycle frame that includes a bicycle electrical component in accordance with a fifth modification.

Referring now to FIG. 11, the frame portion 22 (e.g., the down tube 12b or the seat tube 12d) is provided with a bicycle electrical component 514 in accordance with a fifth modification. Basically, the bicycle electrical component 514 comprises a cover 516, a battery 518 and a wireless communication unit 520. The bicycle electrical component 514 further comprises a casing 528 that is mold to the cover 516. The casing 528 is configured to seal the wireless communication unit 520. Here, the only difference between the bicycle electrical component 14 and the bicycle electrical component 514 is that the bicycle electrical component 514 further comprises a wireless communication unit fastener 550 supporting the wireless communication unit 520 to one of the first and second sides S1 and S2. The wireless communication unit fastener 550 includes at least one of a bolt, a band and adhesive. Here, the wireless communication unit 520 and the casing 528 are attached to the first side S1 by the wireless communication unit fastener 550 and a wireless communication unit fastener 552, which are bolts.

Figure 12:
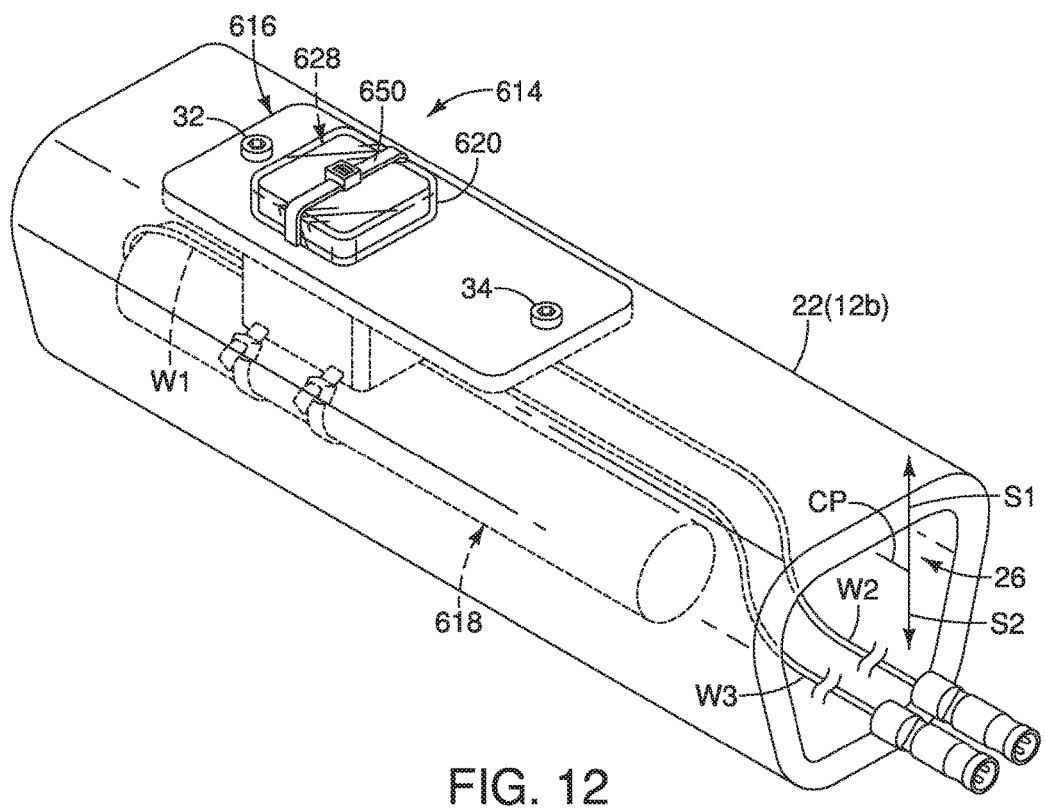
FIG. 12 is a perspective view of a portion of a bicycle frame that includes a bicycle electrical component in accordance with a sixth modification.

Referring now to FIG. 12, the frame portion 22 (e.g., the down tube 12b or the seat tube 12d) is provided with a bicycle electrical component 614 in accordance with a sixth modification. Basically, the bicycle electrical component 614 comprises a cover 616, a battery 618 and a wireless communication unit 620. The bicycle electrical component 614 further comprises a casing 628 that is mold to the cover 616. The casing 628 is configured to seal the wireless communication unit 620. Here, the only difference between the bicycle electrical component 14 and the bicycle electrical component 614 is that the bicycle electrical component 614 further comprises a wireless communication unit fastener 650 supporting the wireless communication unit 620 to one of the first and second sides S1 and S2. The wireless communication unit fastener 650 includes at least one of a bolt, a band and adhesive. Here, the wireless communication unit 620 and the casing 628 are attached to the first side S1 by the wireless communication unit fastener 650, which is a band (e.g., a plastic tie).

Figure 13:
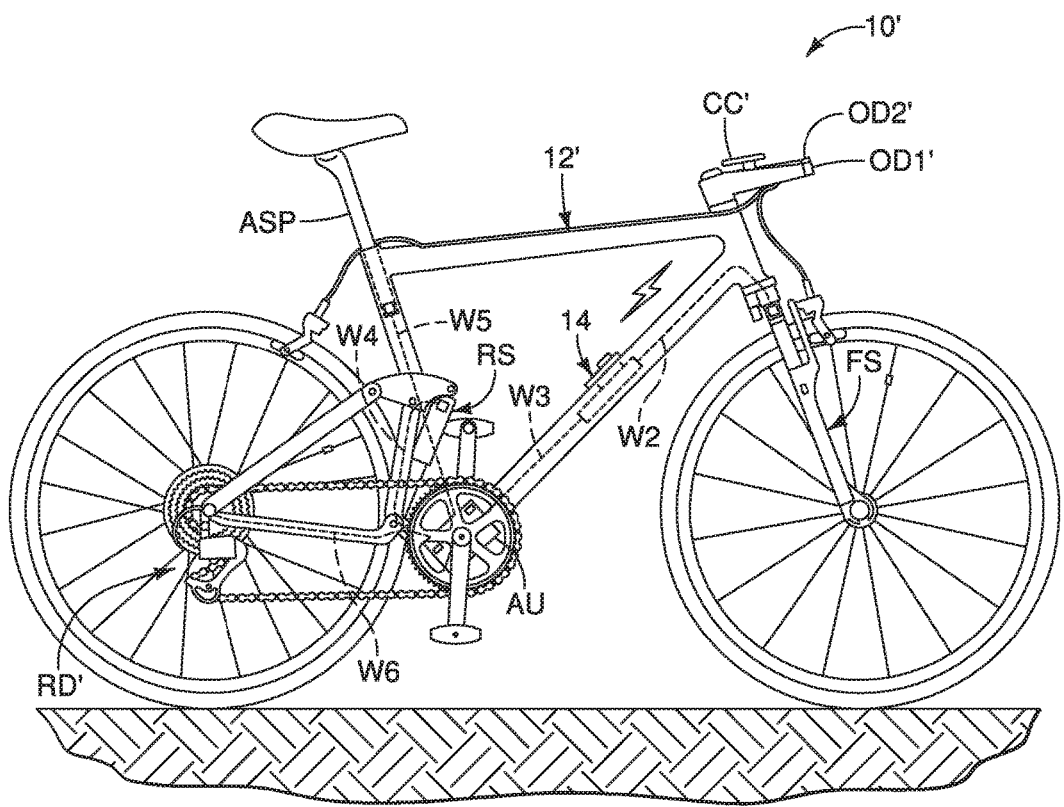
FIG. 13 is a side elevational view of a bicycle having a bicycle frame with a down tube that is equipped with the bicycle electrical component.

Referring now to FIG. 13, a bicycle 10' is illustrated that has a bicycle frame 12' that is provided with the bicycle electrical component 14. Since the bicycle electrical component 14 is the same as the one provided on the bicycle 10, the details of the bicycle electrical component 14 will not be illustrated again in detail with respect to the bicycle frame 12'. Here, the bicycle 10' is provided with an electric rear derailleur RD', an electric adjustable seat post ASP, an electric assist unit AU, an electric rear suspension RS and an electric front suspension FS. The battery 18 is electrically connected to the electric rear derailleur RD', the electric rear suspension RS, the electric adjustable seat post ASP, the electric assist unit AU, and the electric front suspension FS to supply electricity thereto. Here, the bicycle electrical component 14 is electrically coupled to the electric front suspension FS via the electrical power line W2 and electrically coupled to the electric assist unit AU via the electrical power line W3. The electric rear suspension RS is electrically coupled to the electric assist unit AU via the electrical power line W4. The electric adjustable seat post ASP is electrically coupled to the electric assist unit AU via the electrical power line W5. The electric rear derailleur RD' is electrically coupled to the electric rear suspension RS via the electrical power line W6. Thus, the battery 18 is supplies electricity to the electric adjustable seat post ASP and the electric rear derailleur RD' via the electric rear suspension RS. The electric assist unit AU includes an assist motor (not shown) and configured to assist the rotation of the front crank assembly by the assist motor.

The bicycle 10' is further provided with a first operating device OD1', and a second operating device OD2'. Here, the first and second operating devices OD1' and OD2' are multi-function operating devices that have a plurality of electrical switches for outputting wireless signals to the bicycle electrical component 14. The first operating device OD1' has a wireless communication unit that includes at least a wireless transmitter and an electronic controller with a processor. The first operating device OD1' outputs wireless signals to the bicycle electrical component 14 for controlling or adjusting the electric rear derailleur RD' and the electric rear suspension RS based on the operation of the electrical switches of the first operating device OD1'. The second operating device OD2' has a wireless communication unit that includes at least a wireless transmitter and an electronic controller with a processor. The second operating device OD2' outputs wireless signals to the bicycle electrical component 14 for controlling or adjusting the electric front suspension FS based on the operation of the electrical switches of the second operating device OD2'. One of the first and second operating devices OD1' and OD2' is also configured to output wireless signals to the bicycle electrical component 14 for controlling/adjusting the electric adjustable seat post ASP based on the operation of an electrical switch assigned to the electric adjustable seat post ASP. The other of the first and second operating devices OD1' and OD2' is also configured to output wireless signals to the bicycle electrical component 14 for controlling or adjusting the electric assist unit AU based on the operation of an electrical switch assigned to the electric assist unit AU. Accordingly, the first and second operating devices OD1' and OD2' wirelessly communicates with the bicycle electrical component 14 to control or adjust the electric adjustable seat post ASP, the electric assist unit AU, the electric rear derailleur RD', the electric rear suspension RS and the electric front suspension FS.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section." "portion," "member" or "element" when used in the singular can have the dual meaning of a single part or a plurality of parts unless otherwise stated.

As used herein, the following directional terms "frame facing side", "non-frame facing side", "forward". "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle electrical component. Accordingly, these directional terms, as utilized to describe the bicycle electrical component should be interpreted relative to a bicycle in an upright riding position on a horizontal surface and that is equipped with the bicycle electrical component. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, while the bicycle electrical component 14 is mounted in a tubular member of the bicycle frame 12 in the illustrated embodiments, the bicycle electrical component 14 can be adapted to various bicycle components such as a shifting device, a shift operating device, a brake operating device, a cycle computer, a front crank assembly and a rear hub assembly. Also, for example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle electrical component comprising:
    a cover configured to cover an opening formed on a bicycle, the cover having a center plane bisecting the cover in a thickness direction of the cover, a first side and a second side opposite to the first side with respect to the center plane;
    a battery configured to be attached to the cover and to be entirely disposed on one of the first side and the second side; and
    a wireless communication unit configured to be attached to the cover and to be entirely disposed on the other of the first side and the second side.

2. The bicycle electrical component according to claim 1, wherein
    one of the battery and the wireless communication unit is configured to be disposed in a cavity of the bicycle; and
    the cavity is in communication with the opening.

3. The bicycle electrical component according to claim 2, wherein
    the battery is entirely disposed on the first side of the cover and disposed in the cavity of the bicycle.

4. The bicycle electrical component according to claim 3, wherein
    the wireless communication unit is entirely disposed on the second side of the cover.

5. The bicycle electrical component according to claim 4, further comprising
    a casing configured to be attached to the cover and to be entirely disposed on the second side of the cover, the casing configured to seal the wireless communication unit between the casing and the cover.

6. The bicycle electrical component according to claim 5, wherein
    the casing is made of a radio wave transparent material.

7. The bicycle electrical component according to claim 6, wherein
    the casing is made of a plastic material.

8. The bicycle electrical component according to claim 1, further comprising
    a battery fastener supporting the battery to the cover.

9. The bicycle electrical component according to claim 8, wherein
    the battery fastener includes at least one of a bolt, a band and adhesive.

10. The bicycle electrical component according to claim 1, further comprising
    a wireless communication unit fastener supporting the wireless communication unit to one of the first and second sides.

11. The bicycle electrical component according to claim 10, wherein
    the wireless communication unit fastener includes at least one of a bolt, a band and adhesive.

12. The bicycle electrical component according to claim 1, further comprising
    a cover fastener supporting the cover on the bicycle.

13. The bicycle electrical component according to claim 12, wherein
    the cover fastener includes at least one of a bolt and a band.

14. The bicycle electrical component according to claim 1, wherein
    the cover is made of a radio wave transparent material.

15. The bicycle electrical component according to claim 14, wherein
    the cover is made of a plastic material.

16. The bicycle electrical component according to claim 1, wherein
    each of the cover, the battery and the wireless communication unit is a separated member.

17. The bicycle electrical component according to claim 1, wherein
    the battery and the wireless communication unit are integrally molded with the cover.

18. A bicycle frame including the bicycle electrical component according to claim 1, comprising
    a frame portion including the opening, the cover being mounted on the frame portion and covering the opening.

19. The bicycle frame according to claim 18, wherein the frame portion is a down tube.

20. The bicycle frame according to claim 18, wherein the frame portion is a seat tube.

21. The bicycle frame according to claim 18, wherein the frame portion is a tubular member.

* * * * *